S. FLAXBAUM.
POCKET MIRROR.
APPLICATION FILED APR. 17, 1919.
1,327,865.
Patented Jan. 13, 1920.
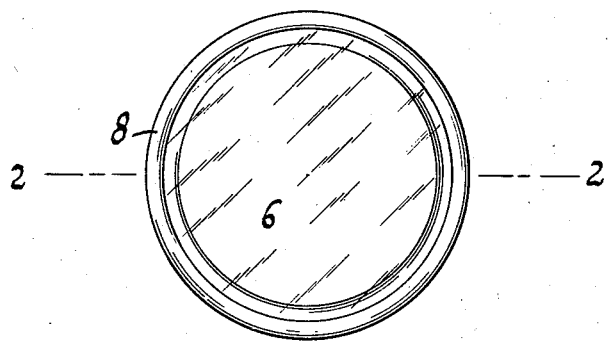
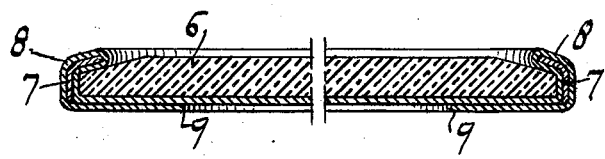
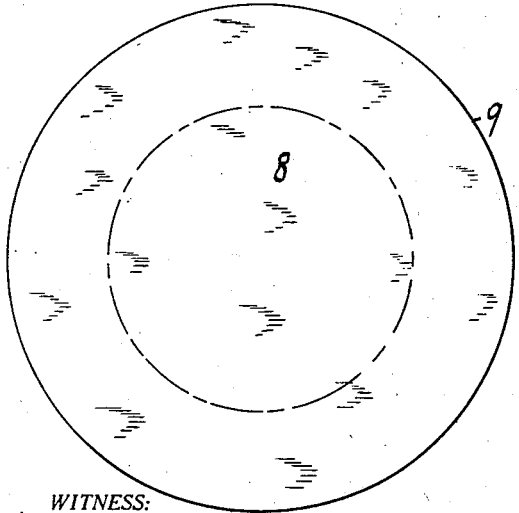
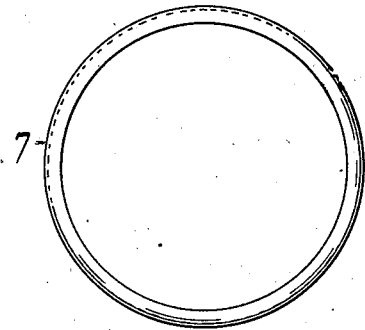
WITNESS:
William Miller
INVENTOR.
Samuel Flaxbaum
BY
Hauff & Sbarland
ATTORNEYS

UNITED STATES PATENT OFFICE.

SAMUEL FLAXBAUM, OF NEW YORK, N. Y.

POCKET-MIRROR.

1,327,865.

Specification of Letters Patent.   Patented Jan. 13, 1920.

Application filed April 17, 1919. Serial No. 290,818.

*To all whom it may concern:*

Be it known that I, SAMUEL FLAXBAUM, a citizen of the United States, residing at New York, in the county of New York and State of New York, have invented new and useful Improvements in Pocket-Mirrors, of which the following is a specification.

This invention relates to a mirror which is especially suitable for carrying in a pocket, mounting in a vanity case, pocketbook or hand bag.

The object of the invention is to provide a glass mirror with a resilient frame arranged about the rim of the glass so as to form a buffer for practically eliminating breakage of the mirror.

The invention resides in the novel combination of parts hereinafter described and claimed and illustrated in the accompanying drawing in which:—

Figure 1 represents a front elevation of a mirror embodying this invention.

Fig. 2 is a section taken along the line 2—2 of the same on a larger scale.

Fig. 3 is a front view of a piece of fabric.

Fig. 4 is a similar view of the annular member.

In the drawing the numeral 6 designates a circular glass mirror which is preferably provided with a beveled rim as shown. The protective ornamental frame includes an annular core member 7 formed of resilient metal. The member is angular transversely so as to encircle the rim and be supported on the front of the glass. The member is secured to the glass by means of a pliable material such as a piece of fabric 8 having a circular margin 9 adapted to be fastened by gluing or otherwise to the back of the fabric. The annular member in connection with its envelop or fabric compensates for any shocks sustained by the mirror.

The method of assembling and arranging the frame about the rim of the mirror is as follows: The glass face up is placed on a piece of fabric of the shape shown in Fig. 3. The circular margin is then drawn over the rim of the glass, the annular member is then placed onto the rim and the fabric is doubled or looped over the member to entirely cover it, and the border of fabric is glued to the bottom of the fabric to prevent shift of the frame.

As shown in Fig. 2 the top or plane surface of the glass is slightly below the height of the front portions of the frame so that it takes up the impact, while the double lapped layer of fabric will offer the same resistance to the back. The mirror can be made of any shape or size and the fabric covering on the bottom can be glued thereto if desired. When the frame is in place the looped edge of fabric firmly hugs the face of the glass and cannot be lifted or accidentally forced off the rim. The fabric constitutes a one-piece seamless cover for securely locking the frame to the rim of the mirror.

I claim:—

1. A mirror comprising a frame formed of a core member arranged upon the border and surrounding the edge of the mirror, and a fabric looped about the member with its margin and the inner portion of the fabric connected to the back of the mirror.

2. A mirror comprising a frame formed of a transversely angular annular core member arranged about the top and surrounding the rim of the mirror, and a fabric covering the bottom of the mirror having a portion looped about the core member with a margin glued on to the fabric at the back of the mirror.

In testimony whereof I have hereunto set my hand in the presence of two subscribing witnesses.

SAMUEL FLAXBAUM.

Witnesses:
 WM. E. HARLAND,
 KATHARINE S. KEANE.